UNITED STATES PATENT OFFICE 2,552,980

ALKYLATION OF OLEFINIC COMPOUNDS

Elbert C. Ladd, Passaic, and Lewis Y. Kiley, Westwood, N. J., assignors to United States Rubber Company, New York, N. Y., a corporation of New Jersey No Drawing. Application June 24, 1949,
Serial No. 101,260

6 Claims. (Cl. 260—683.4)

This invention relates to alkylation of olefinic compounds by alpha-tertiary-alkanals, preferably in the presence of a free radical catalyst.

The present invention relates to a novel type of reaction between compounds having carbon-carbon unsaturation, and aliphatic aldehydes having the hydrogens on the alpha carbon atom completely substituted by hydrocarbon radicals, i. e., tri(hydrocarbon)methanecarboxaldehydes, which we hereafter call alpha-tertiary-alkanals.

It is known that primary and secondary aliphatic aldehydes will react with compounds having carbon-to-carbon unsaturation, in the presence of compounds decomposing to form free radicals, to yield ketones, thus:

(1)

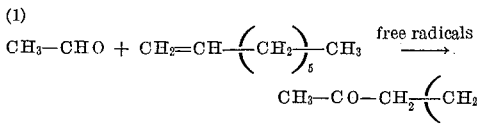

We have now discovered that under these conditions, alpha-tertiary-alkanals react in a markedly different manner characterized by elimination of carbon monoxide and reaction of the residual hydrogen and tertiary-hydrocarbon radicals with the unsaturated compound, thus:

(2)

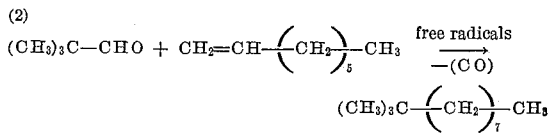

The alpha-tertiary-alkanals which are operable in our invention may be represented by the formula $(R_1)(R_2)(R_3)C$—CHO wherein $R_1$ is a lower alkyl radical (e. g., methyl, ethyl, propyl, butyl, amyl, hexyl), and $R_2$ and $R_3$ are each one of the radicals methyl and ethyl. Examples of such alkanals are neopentanal (i. e., 2,2-dimethylpropanal), 2,2 - dimethylbutanal, 2 - ethyl - 2 - methylbutanal, and 2,2-dimethylhexanal.

Among the reactive unsaturated compounds, a preferred class comprises terminally unsaturated monoolefinic compounds of the following types:

(1) Olefinic hydrocarbons, such as ethylene, propene, butene-1, isobutylene, pentene-1, hexene-1, octene-1, decene-1, styrene, p-methylstyrene, and alpha-methylstyrene;

(2) Alkenoic acids and derivatives hydrolyzable thereto, such as acrylic acid, acrylonitrile, methacrylamide, 4-pentenoic acid, 10-undecylenic acid, and methyl 10-undecylenate;

(3) Alkenols and their ethers and esters such as allyl alcohol, allyl acetate, allyl chloride, methallyl ethyl ether, vinyl acetate, vinyl benzoate, ethyl vinyl ether, and vinyl chloride.

When the readily polymerizable types of olefinic reactants are employed, e. g., styrene, methyl methacrylate, or acrylonitrile, the reaction product may also contain a certain amount of higher molecular weight materials containing several units derived from the olefinic reactant; for example:

(3)

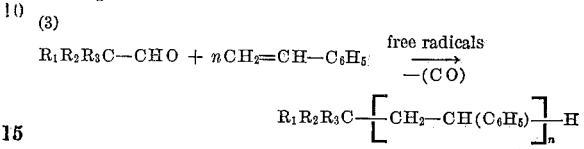

where $n$ is 1 or more, e. g., 1–20.

Representative reactions embraced by our process are listed below together with the reaction products in which $n=1$ (of reaction 3 above):

(4)
$(CH_3)_3C$—CHO + $CH_2$=$C(CH_3)_2$ ⟶
$(CH_3)_3C$—$CH_2$—$CH(CH_3)_2$ (5)
$(CH_3)_3C$—CHO + $CH_2$=CH—$CH_3$ ⟶
$(CH_3)_3C$—$CH_2$—$CH_2$—$CH_3$ (6)
$CH_3$—$CH_2$—$C(C_2H_5)_2$—CHO + $CH_2$=CH—CH=$CH_2$ ⟶
$CH_3$—$CH_2$—$C(C_2H_5)_2$—$CH_2$—CH=CH—$CH_3$ (7)
$(CH_3)_3C$—CHO + $CH_2$=CH—$C_6H_5$ ⟶
$(CH_3)_3C$—$CH_2$—$CH_2$—$C_6H_5$ (8)

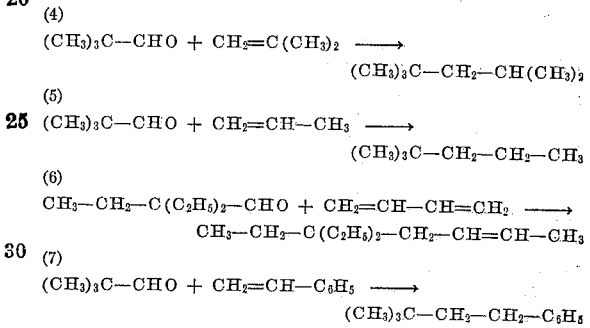

(9)
$(CH_3)_3C$—CHO + $CH_2$=CH—O—CO—$CH_3$ ⟶
$(CH_3)_3C$—$CH_2$—$CH_2$—O—CO—$CH_3$

(10)
$(CH_3)_3C$—CHO + $CH_2$=CH—CN ⟶
$(CH_3)_3C$—$CH_2$—$CH_2$—CN

(11)
$(CH_3)_3C$—CHO + $CH_2$=CH—O—$C_2H_5$ ⟶
$(CH_3)_3C$—$CH_2$—$CH_2$—O—$C_2H_5$ (12)

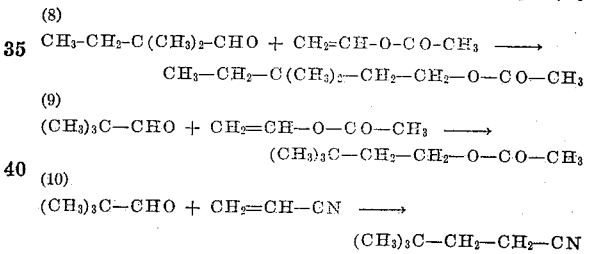

(13)

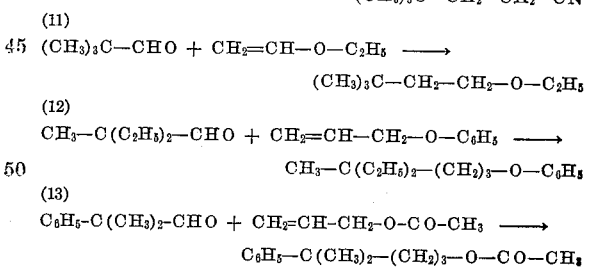

Such products find use as solvents, plasticizers, lube-oil additives, and textile assistants, as well as intermediates for chemical syntheses.

The process of our invention is carried out by heating, at temperatures of 50–150° C., preferably at 50–120° C., a mixture of the aldehyde and the olefinic reactant in molar ratios of 1:10 to 20:1, preferably from 1:1 to 10:1. The reaction time will vary somewhat with the temperature and the specific reactants employed, but times in the range of 2–60 hours will usually suffice.

The reaction is promoted by the presence of materials capable of undergoing thermal decomposition to yield free radicals, such as peroxidic compounds (e. g., hydrogen peroxide, tertiary-butylhydroperoxide, and acyl peroxides typified by benzoyl peroxide and acetyl peroxide), metal alkyls (e. g., sodium methyl, potassium amyl, lead tetraethyl), and alpha,alpha′-azobis(alpha-alkylalkanoic) acids and derivatives hydrolyzable thereto (including the esters, nitriles and amides, e. g., alpha,alpha′-azobisisobutyric acid, alpha,alpha′-azobisisobutyronitrile, and alpha,alpha′-azobis(alpha-methylbutyronitrile)). Such compounds are ordinarily employed in amounts of from 0.1 to 15.0% by weight based on the reactants.

At the conclusion of the reaction the products can be isolated by preferential extraction, fractional distillation or crystallization.

The following example discloses our invention in more detail. All parts are by weight.

*Example*

A mixture of 183 parts of neopentanal [$(CH_3)_3C$—CHO], 80 parts of 1-octene and 6.9 parts of benzoyl peroxide is heated at reflux for 21 hours after which 6.9 parts of the peroxide are added and the reaction is completed by heating an additional 27 hours. During the reaction, carbon monoxide is evolved.

The reaction mixture is finally evaporated under reduced pressure to remove any unreacted starting materials, and the residue is washed with dilute (5%) aqueous sodium bicarbonate and finally with water. After drying, the residue is fractionally distilled to yield about 50 parts of a new dodecane, believed to be 2,2-dimethyldecane, b. 64° C./5 mm.; $n_D^{20}$ 1.4199; mol. wt. (in benzene) 170 (theory for $C_{12}H_{26}$, 170); carbon bound 84.5% (theory, 84.6%); hydrogen found, 14.9% (theory, 15.4%).

Having thus described our invention, what we claim and desire to protect by Letters Patent is:

1. A method of alkylating a compound containing ethylenic carbon-to-carbon unsaturation which comprises heating said compound, in the presence of a peroxidic compound catalyst, with an alpha-tertiary-alkanal of the formula $(R_1)(R_2)(R_3)C$—CHO where $R_1$ represents a lower alkyl radical, and $R_2$ and $R_3$ each being one of the radicals methyl and ethyl, and forming the desired alkylated compound with elimination of carbon monoxide.

2. A method of alkylating an olefinic compound which comprises heating the same at a temperature between 50° C. and 150° C. with an alpha-tertiary-alkanal of the formula $$(R_1)(R_2)(R_3)C\text{—CHO}$$

where $R_1$ represents a lower alkyl radical, $R_2$ and $R_3$ each being one of the radicals methyl and ethyl, the reaction being promoted by the addition of a peroxidic compound catalyst, and forming the desired alkylated compound with elimination of carbon monoxide.

3. A method of alkylating an olefinic compound which comprises heating the same, in the presence of a peroxidic compound catalyst, with neopentanal at a temperature between 50° C. and 150° C., and forming the desired alkylated compound with elimination of carbon monoxide.

4. A method of alkylating a mono-olefin hydrocarbon which comprises heating the same, in the presence of a peroxidic compound catalyst, with an alpha-tertiary-alkanal of the formula $(R_1)(R_2)(R_3)C$—CHO where $R_1$ represents a lower alkyl radical, and $R_2$ and $R_3$ each being one of the radicals methyl and ethyl, at a temperature between 50° C. and 150° C., and forming the desired alkylated compound with elimination of carbon monoxide.

5. A method of alkylating a 1-alkene hydrocarbon which comprises heating the same, in the presence of a peroxidic compound catalyst, with an alpha-tertiary-alkanal of the formula $(R_1)(R_2)(R_3)C$—CHO where $R_1$ represents a lower alkyl radical, and $R_2$ and $R_3$ each being one of the radicals methyl and ethyl, at a temperature between 50° C. and 150° C., and forming the desired alkylated compound with elimination of carbon monoxide.

6. A method of alkylating 1-octene which comprises heating the same, in the presence of a peroxidic compound catalyst, with an alpha-tertiary-alkanal of the formula $$(R_1)(R_2)(R_3)C\text{—CHO}$$

where $R_1$ represents a lower alkyl radical, and $R_2$ and $R_3$ each being one of the radicals methyl and ethyl, at a temperature between 50° C. and 150° C., and forming the desired alkylated compound with elimination of carbon monoxide.

ELBERT C. LADD.
LEWIS Y. KILEY.

REFERENCES CITED

The following references are of record in the file of this patent:

UNITED STATES PATENTS

| Number | Name | Date |
|---|---|---|
| 2,402,137 | Hanford et al. | June 18, 1946 |